United States Patent [19]

Wada

[11] Patent Number: 4,644,481
[45] Date of Patent: Feb. 17, 1987

[54] ELECTRONIC THERMOMETER
[75] Inventor: Yoshihiro Wada, Nara, Japan
[73] Assignee: Sharp Kabushiki Kaisha, Osaka, Japan
[21] Appl. No.: 634,421
[22] Filed: Jul. 26, 1984
[30] Foreign Application Priority Data
　　Jul. 28, 1983 [JP] Japan ................... 58-140055
[51] Int. Cl.⁴ ............................................. G01K 7/32
[52] U.S. Cl. ..................... 364/557; 374/100; 377/25
[58] Field of Search ............... 364/557; 374/100, 103, 374/185; 377/19, 20, 25

[56] References Cited
U.S. PATENT DOCUMENTS

| 3,834,238 | 9/1974 | Mueller et al. | 377/25 |
| 3,996,451 | 12/1976 | Harrington et al. | 377/25 |
| 4,015,208 | 3/1977 | Hammer et al. | 377/25 |
| 4,150,573 | 4/1979 | Iinuma | 377/25 |
| 4,176,556 | 12/1979 | Takenaka | 364/557 |
| 4,493,565 | 1/1985 | Saka | 377/25 |
| 4,505,599 | 3/1985 | Nonaka | 377/25 |
| 4,506,995 | 3/1985 | Polster | 364/557 |

FOREIGN PATENT DOCUMENTS 2058357 4/1981 United Kingdom ............... 374/103

Primary Examiner—Errol A. Krass
Attorney, Agent, or Firm—Birch, Stewart, Kolasch & Birch

[57] ABSTRACT

An electronic thermometer comprises an oscillator operatively connectable to a temperature-sensitive resistance, a counter for counting an oscillation frequency of the oscillator, a timer for timekeeping a time of counting by providing the counter, a memory responsive to the counter for storing temperature data, in such a manner that each address stores a specific data representative of the presence and the absence of the temperature increase in a divided temperature measurement interval, and a calculation circuit for calculating temperature data with the count of the counter and the specific data of the memory.

9 Claims, 2 Drawing Figures

ELECTRONIC THERMOMETER

BACKGROUND OF THE INVENTION

The present invention relates to an electronic thermometer for measuring a temperature on the basis of the resistance value of a temperature-sensitive resistance and, more particularily, to an electronic thermometer for detecting a temperature such as a body temperature on the basis of an oscillating frequency change, due to temperature change, of an oscillator to which a temperature-sensitive resistance is connected as a frequency determining element.

Generally, the temperature-sensitive resistance is used in the thermometer so as to measure a temperature on the basis of an oscillating frequency change of a CR oscillator to which the temperature-sensitive resistance is connected.

However, a temperature value corresponding to each of the oscillating frequencies must be previously stored into a memory. For example, for a clinical thermometer, the body temperature values from 35.0 degrees C. to 42.0 degrees C. are stored for display in response to the oscillating frequencies. It may be possible that the temperature values from 35.0 degrees C. to 42.0 degrees C. are stored in the memory in 0.1 degree C. intervals to a count of 80 intervals. In this case, the count number for each of the 80 intervals corresponds to one of a great number of the temperature values which may be displayed. When the temperature values from 35.0 degrees C. to 42.0 degrees C. are stored in the memory, the values from 35.0 degrees C. to 42.0 degrees C. are converted into binary coded decimal codes from 350 to 420, respectively. A high-order digit ("3" or "4") is expressed by a binary code "0" or "1" as one bit, and each of the lower two digits ("0"–"9") are expressed by binary codes of 4 bits. Accordingly, 9 bits of data are required to represent one of the temperature values, so that a memory capacity of 720(=9×80) bits is required for storing all the temperature values from 35.0 degrees C. to 42.0 degrees C. with 0.1 degree C. intervals. Further, because of the necessity for a high capacity memory, the thermometer is prevented from being miniaturized at a low-cost.

SUMMARY OF THE INVENTION

Accordingly, it is an object of the present invention to provide an improved thermometer for measuring a temperature on the basis of a resistance value of a temperature-sensitive resistance in which a reduced memory capacity is required for storing temperature values corresponding to oscillating frequencies generated from an oscillator to which the temperature-sensitive resistance is connected.

It is another object of the present invention to provide an improved thermometer for detecting a temperature on the basis of an oscillating frequency change, due to the temperature change, of an oscillator to which a temperature-sensitive resistance showing a non-linear characteristic is connected as a frequency determining element, wherein the non-linear characteristic of the temperature-sensitive resistance is rectified by a non-linear rectifying means comprising a counter for counting the oscillating frequency of the oscillator and memory means for storing one bit data of a temperature data at each address corresponding to the count of the counter, in order to accumulate the outputs of the memory means.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to an embodiment of the present invention, an electronic thermometer comprises oscillating means operatively connectable to a temperature-sensitive resistance, counter means for counting an oscillation frequency of the oscillating means, timer means for timekeeping a time of counting by providing the counter means, memory means responsive to the counter means for storing temperature data, in such a manner that each address stores a specific data representative of the presence and the absence of the temperature increase in a divided temperature measurement interval, and calculation means for calculating temperature data with the count of the counter means and the specific data of the memory.

The electronic thermometer further comprises a reference resistance operatively connected to the oscillating means, wherein the reference resistance is provided for defining a predetermined number to which the counter means continues to count.

BRIEF DESCRIPTION OF THE INVENTION

The present invention will be better understood from the detailed description given hereinbelow and the accompanying drawings which are given by way of illustration only, and thus are not limitative of the present invention and wherein:

FIG. 1 shows is a block diagram of a clinical thermometer of a preferred example of a thermometer according to an embodiment of the present invention; and FIG. 2 shows a relationship between the temperature and the count of the counter.

DETAILED DESCRIPTION OF THE INVENTION

Prior to the description of an embodiment of the present invention, the principle of measuring a temperature by using a temperature-sensitive resistance will be described below.

When the temperature-sensitive resistance is used as a part of a CR oscillator, an oscillating frequency F from the CR oscillator is written as follows if an error is disregarded.

$$F = \frac{k}{C \cdot R} \quad (1)$$

where k is a constant, C is a capacity of a capacitance, and R is a resistance.

Also, when a thermistor is used as the temperature-sensitive resistance, the relationship between the resistance R and an absolute temperature T is expressed in theory as follows.

$$R = R_0 \cdot \exp B \cdot \left(\frac{1}{T} - \frac{1}{T_0}\right) \quad (2)$$

where $R_0$ is a resistance of the thermistor when the absolute temperature T is $T_0$, and B is a thermistor constant.

The absolute temperature T is expressed as follows by using the equations (1) and (2).

$$T = \frac{1}{\frac{1}{T_0} + \frac{1}{B} \cdot (\ln F_o - \ln F)} \quad (3)$$

where $F_0$ is an oscillating frequency when the absolute temperature T is $T_0$.

The temperature T is a function of the oscillating frequency F, so that the temperature is calculated and measured by detecting the oscillating frequency change.

A clinical thermometer which is used as a preferred example of a thermometer according to an embodiment of the present invention will be described with reference to FIG. 1.

Figure 1:
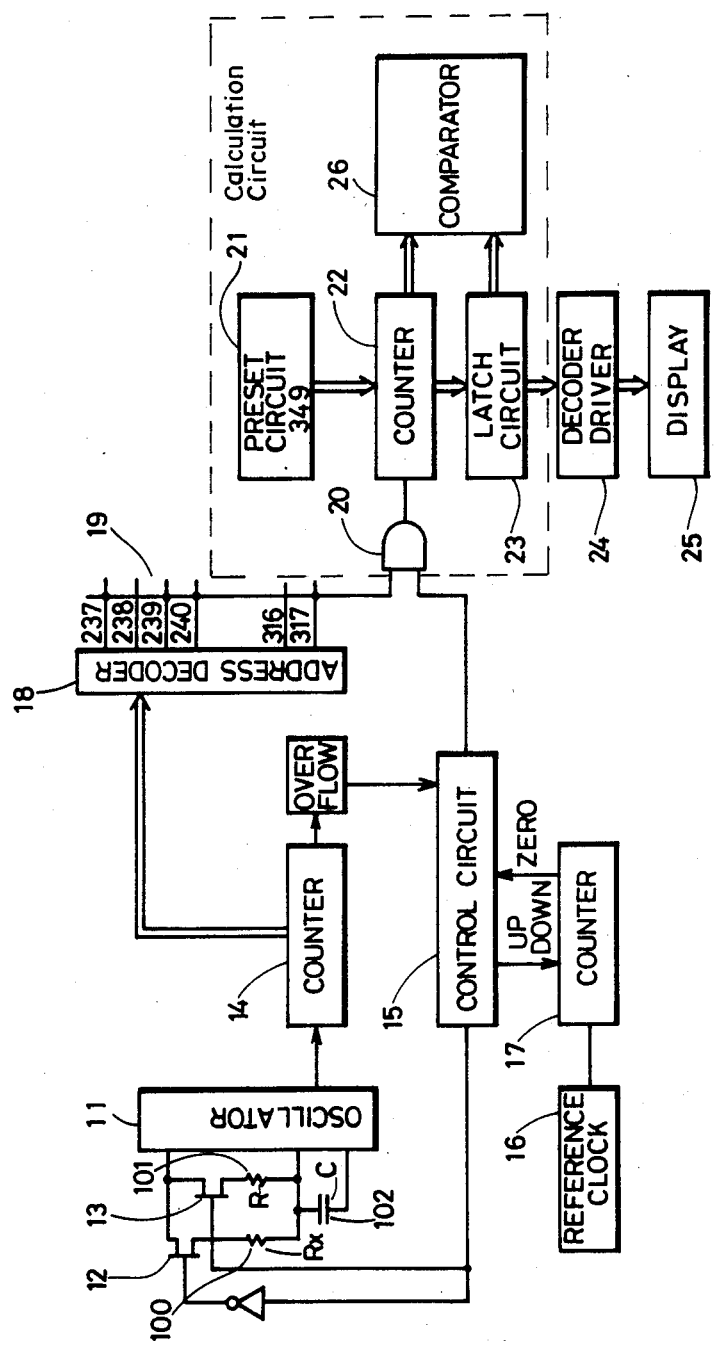

FIG. 1 is a block diagram of a clinical thermometer of an embodiment of the present invention.

A reference resistance 101 (resistance R) and a temperature-sensitive resistance 100 (resistance Rx) such as a thermistor are connected to a capacitance 102 (capacity C) and are connected to an oscillator 11 to form a CR oscillator. The oscillator 11 generates an oscillating frequency decided by a time constant by the capacity C of the capacitance 102 and either the resistance Rx of the thermistor 100 or the resistance R of the reference resistance 101. The resistance valve of the reference resistance 101 rarely changes in response to the surrounding temperature. The resistance of the temperature-sensitive resistance 100 changes in response to the surrounding temperature.

An analog switch 13 is connected between the reference resistance 101 and the oscillator 11, and an analog switch 12 is connected between the thermistor 100 and the oscillator 11. The switching of the analog switches 12 and 13 are controlled by a control circuit 15. An output of the oscillator 11 is applied to a counter 14. The counter 14 is counted up by a predetermined value, and the output of the counter 14 is applied to an address decoder 18. The counter 14 overflows when the count of the counter 14 is more than the predetermined value, and the counter 14 includes a calculation means for calculating. The overflow output from the counter 14 is applied to the control circuit 15.

The control circuit 15 is connected to a reference clock oscillator 16 via a counter 17. The reference clock oscillator 16 generates a specific clock frequency and the output of the reference clock oscillator 16 is applied to the control circuit 15 via the counter 17.

The reference clock oscillator 16 and the counter 17 measure a time period by an overflow of the control circuit 15.

Figure 2:
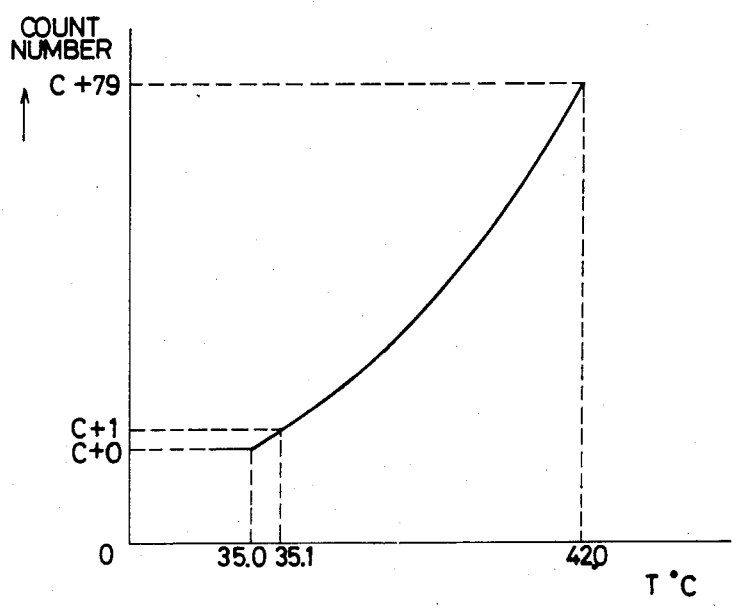

FIG. 2 shows a relationship between the temperature and the count of the counter. The temperature values from 35.0 degrees C. to 42.0 degrees C. are displayed at 0.1 degree C. interval to count 80 intervals.

In case where the count is selected to be "C" corresponding to the condition when the body temperature is 35.0 degrees C., the count is defined "C+79" when the temperature is 42.0 degrees C.

Concretely, substitute B=4000, $T_0$=35.0, F (or C)=237 for the equation (3), and a (body) temperature (Seven significant digits: degrees C.) and the display values (round off the fractions to two decimal places: degrees C.) are shown in table 1.

TABLE 1

| COUNT (ADDRESS) | BODY TEMPERATURE | DISPLAY | MEMORY |
|---|---|---|---|
| 237 | 35.00000 | 35.0 | 1 |
| 238 | 35.09989 | 35.1 | 1 |
| 239 | 35.19942 | 35.2 | 1 |
| 240 | 35.29862 | 35.3 | 1 |
| 241 | 35.39744 | 35.4 | 1 |
| 242 | 35.49593 | 35.5 | 1 |
| 243 | 35.59407 | 35.6 | 1 |
| 244 | 35.69188 | 35.7 | 1 |
| 245 | 35.78934 | 35.8 | 1 |
| 246 | 35.88647 | 35.9 | 1 |
| 247 | 35.98327 | 36.0 | 1 |
| 248 | 36.07973 | 36.1 | 1 |
| 249 | 36.17587 | 36.2 | 1 |
| 250 | 36.27168 | 36.3 | 1 |
| 251 | 36.36717 | 36.4 | 1 |
| 252 | 36.46234 | 36.5 | 1 |
| 253 | 36.55718 | 36.6 | 1 |
| 254 | 36.65172 | 36.7 | 1 |
| 255 | 36.74593 | 36.7 | 0 |
| 256 | 36.83984 | 36.8 | 1 |
| 257 | 36.93344 | 36.9 | 1 |
| 258 | 37.02672 | 37.0 | 1 |
| 259 | 37.11971 | 37.1 | 1 |
| 260 | 37.21239 | 37.2 | 1 |
| 261 | 37.30477 | 37.3 | 1 |
| 262 | 37.39685 | 37.4 | 1 |
| 263 | 37.48864 | 37.5 | 1 |
| 264 | 37.58013 | 37.6 | 1 |
| 265 | 37.67133 | 37.7 | 1 |
| 266 | 37.76224 | 37.8 | 1 |
| 267 | 37.85286 | 37.9 | 1 |
| 268 | 37.94319 | 37.9 | 0 |
| 269 | 38.03324 | 38.0 | 1 |
| 270 | 38.12301 | 38.1 | 1 |
| 271 | 38.21250 | 38.2 | 1 |
| 272 | 38.30171 | 38.3 | 1 |
| 273 | 38.39064 | 38.4 | 1 |
| 274 | 38.47930 | 38.5 | 1 |
| 275 | 38.56768 | 38.6 | 1 |
| 276 | 38.65580 | 38.7 | 1 |
| 277 | 38.74364 | 38.7 | 0 |
| 278 | 38.83122 | 38.8 | 1 |
| 279 | 39.91853 | 38.9 | 1 |
| 280 | 39.00558 | 39.0 | 1 |
| 281 | 39.09237 | 39.1 | 1 |
| 282 | 39.17889 | 39.2 | 1 |
| 283 | 39.26516 | 39.3 | 1 |
| 284 | 39.35117 | 39.4 | 1 |
| 285 | 39.43693 | 39.4 | 0 |
| 286 | 39.52243 | 39.5 | 1 |
| 287 | 39.60768 | 39.6 | 1 |
| 288 | 39.69268 | 39.7 | 1 |
| 289 | 39.77743 | 39.8 | 1 |
| 290 | 39.86194 | 39.9 | 1 |
| 291 | 39.94620 | 39.9 | 0 |
| 292 | 40.03021 | 40.0 | 1 |
| 293 | 40.11398 | 40.1 | 1 |
| 294 | 40.19752 | 40.2 | 1 |
| 295 | 40.28081 | 40.3 | 1 |
| 296 | 40.36386 | 40.4 | 1 |
| 297 | 40.44668 | 40.4 | 0 |
| 298 | 40.52927 | 40.5 | 1 |
| 299 | 40.61162 | 40.6 | 1 |
| 300 | 40.69374 | 40.7 | 1 |
| 301 | 40.77562 | 40.8 | 1 |
| 302 | 40.85728 | 40.9 | 1 |
| 303 | 40.93871 | 40.9 | 0 |
| 304 | 41.01992 | 41.0 | 1 |
| 305 | 41.10090 | 41.1 | 1 |
| 306 | 41.18166 | 41.2 | 1 |
| 307 | 41.26219 | 41.3 | 1 |

TABLE 1-continued

| COUNT (ADDRESS) | BODY TEMPERATURE | DISPLAY | MEMORY |
|---|---|---|---|
| 308 | 41.34251 | 41.3 | 0 |
| 309 | 41.42260 | 41.4 | 1 |
| 310 | 41.50248 | 41.5 | 1 |
| 311 | 41.58214 | 41.6 | 1 |
| 312 | 41.66158 | 41.7 | 1 |
| 313 | 41.74081 | 41.7 | 0 |
| 314 | 41.81983 | 41.8 | 1 |
| 315 | 41.89863 | 41.9 | 1 |
| 316 | 41.97722 | 42.0 | 1 |
| 317 | 42.05561 | 42.1 | 1 |

A read only memory (ROM) 19 is connected to the address decoder 18. Addresses 237–317 of the ROM 19 correspond to the counts of the counter 14 (or the oscillating frequencies), respectively. Data relating to temperature data is previously stored into each of the addresses 237–317. The number of the addresses 237–317 is not limitative.

The memory contents corresponding to the addresses 237–317 are of one bit data of "0" or "1". A principle for storing one bit data "1" or "0" into each of the addresses 237–317 will be described below.

When the oscillating frequency F is generated from the oscillator 11, the body temperature T is calculated by the equation (3), so that the body temperature T is a function of the oscillating frequency F.

$$T = f(F)$$

Now, if the oscillating frequencies $F_1, F_2, F_3, \ldots F_{n-1}, F_n \ldots$ are applied, the body temperatures $T_1, T_2, T_3, \ldots T_{n-1}, T_n \ldots$ (an integral number n is greater than or equal to an integral number 2) are calculated.

$$T_1 = f(F_1)$$
$$T_2 = f(F_2)$$
$$T_3 = f(F_3)$$
$$\vdots$$
$$T_{n-1} = f(F_{n-1})$$
$$T_n = f(F_n)$$
$$\vdots$$

Each of the temperatures $T_1, T_2, T_3, \ldots T_{n-1}, T_n \ldots$ calculated by the equation (3) is a real number and corresponds to each of the body temperatures in table 1. Each of the temperatures $T_1, T_2, T_3, \ldots T_{n-1}, T_n \ldots$ calculated is converted into 3-digit numerals corresponding to each of the display values in table 1.

The method of converting the temperature $T_1, T_2, T_3, \ldots T_{n-1}, T_n \ldots$ calculated into the 3-digit numerals is as follows.

If the real number A is converted into an integral number B by a function INT, the integral number B is expressed as follows.

$$B = INT(A)$$

The above temperatures $T_1, T_2, T_3, \ldots T_{n-1}, T_n, \ldots$ (where the integral number n is assumed to be greater than or equal to an integral number 2) are converted into the integral number by equations below.

$$T'_1 = INT((T_1 + 0.05) \times 10)$$
$$T'_2 = INT((T_2 + 0.05) \times 10)$$
$$T'_3 = INT((T_3 + 0.05) \times 10)$$
$$\vdots$$
$$T'_{n-1} = INT((T_{n-1} + 0.05) \times 10)$$
$$T'_n = INT((T_n + 0.05) \times 10)$$
$$\vdots$$

The left side values calculated in each of the above equations are divided by 10 to calculate the 3-digit real numbers corresponding to the display values in table 1.

$$T''_1 = T'_1/10$$
$$T''_2 = T'_2/10$$
$$T''_3 = T'_3/10$$
$$\vdots$$
$$T''_{n-1} = T'_{n-1}/10$$
$$T''_n = T'_n/10$$
$$\vdots$$

If $T''_{n-1} = T''_n$, one bit data of "0" is stored in the address n. If $T''_{n-1} = T''_n + 0.1$, one bit data of "1" is stored in the address n.

In the above manner, the fixed value 0.05 is used because the difference is 0.1. When the fixed value is represented as Z, the value $T'_m$ is expressed as follows.

$$T'_m = (1/10) \times (INT((T_m + Z) \times 10))$$

where an integral number m is greater than or equal to an integral number 2.

If $T'_{m-1} = T'_m$, the one bit of "0" is stored in the address m. If $T'_{m-1} = T'_m + (Z \times 2)$, the one bit data of "1" is stored in the address m.

The switch 13 is first switched on by the control circuit 15, so that the reference resistance 101 is connected to the oscillator 11 for oscillation, and the oscillating frequency generated by the oscillator 11 is counted up by the counter 14, and at the same time, the counter 17 counts up the reference clock signal generated by the reference clock oscillator 16.

When the counter 14 overflows from the predetermined value (or when the count of the counter 14 is greater than the predetermined value), the counter 17 is stopped from continuing to count. The count of the counter 17 when counting is stopped defines a gate open period of a gate circuit 20.

Next, the switch 13 is switched off by the control circuit 15, and the switch 12 is switched on by the control circuit 15, so that the thermistor 100 is connected to the oscillator 11 for oscillation, and at the same time, the counter 17 is started to count down from the stopped count. A preset circuit 21 sets a constant 349 into a counter 22. The constant 349 corresponds to a temperature of 34.9 degrees C. The counter 22 includes a calculation means for calculating.

The gate circuit 20 remains open while the counter 17 counts down from the stopped count to the count "0". The oscillating frequency of the oscillator 11 is counted up by the counter 14. The initial count of the counter 14 is set to "0", and the address decoder 18 decodes the value "0" of the counter 14 and the value stored in the address "0" of the ROM 19 is referred to. If the value of the address "0" is "1", the counter 22 is counted up via the gate circuit 20, and after, the counter 14 is counted up by "1". The value in the address "1" of the ROM 19 is referred to in the same manner. If the value of the address "1" is "0", the counter 22 is not counted up. The ROM 19 is referred to every time the counter 14 is counted up, and the counter 22 counts up by 1 when the memory content in the address of the AOM 19 is "1", and does not count up when the memory content into the address of the ROM 19 is "0". The above operation is continued until the gate circuit 22 is closed. The frequency generated from the oscillator 11 which is connected to the temperature-sensitive resistance is counted up by the counter 14 during a time period decided by the reference resistance or the predetermined period without using the reference resistance.

In the present embodiment, when the count of the counter 14 is more than the count of 237, the memory contents in the ROM 19 are sequentially read out. If the memory content read out is "1", the value "1" is added to the preset value of 349 by the calculation means in the counter 22. In the present invention, the body temperature T is calculated by the following equation.

$$T = (1/10) \cdot \left( 349 + \sum_{x=237}^{n} M(X) \right)$$

where n is a count of the counter 14 when the counting of the counter 14 has been terminated, and M(x) is a value stored into the address X of the ROM 19 (for example, "0" or "1").

A latch circuit 23 temporarily latches the maximum value of the body temperature measured. After the gate circuit 20 is closed and the counting of counter 14 is terminated, the (body) temperature calculated from the count of the counter 22 and the (body) temperature latched into the latch circuit 23 are compared with each other. If the temperature calculated from the count of the counter 22 is greater than the temperature latched into the latch circuit 23, the temperature calculated from the count of the counter 22 is temporarily latched into the latch circuit 23. The (body) temperature latched into the latch circuit 23 is displayed on a display device 25 such as a liquid crystal display device or the like via a decoder driver 24. The display device 25 is provided for displaying temperature data calculated by the calculation means in the counter 22.

In the above embodiment, the temperature-sensitive resistance which changes the resistance value in response to the surrounding temperature and the reference resistance which rarely changes the resistance value in response to the surrounding temperature are connected to the oscillator, so that the temperature detected by the temperature-sensitive resistance is measured by comparing the oscillating frequencies, generated from the oscillator connected to each of the above resistances, to each other.

The temperature detected by the temperature-sensitive resistance may be measured by the oscillating frequency generated from the oscillator connected to a temperature sensitive resistance during a predetermined time period without comparison to an oscillation by the reference resistance. Further, the one bit data in the form of "1" and "0" in the ROM 19 may be replaced, and the (body) temperature may be calculated on the basis of a total number of the one bit data of "0".

Although a single counting of the counter in the above embodiment corresponds to the temperature of 0.1 degree C. interval, in the case where the measuring resolution is to be improved or the temperature is to be displayed at 0.05 degree C. intervals, the count number corresponding to the temperature may be made larger and the capacity of the ROM may be made larger.

To provide the condition where the display resolution is set to 0.1 degree C. and the measuring resolution is improved to about 0.05 degree C., the steps of the counter 14 may be increased by 1, and the addresses of the ROM 19 may be doubled, and further, the open period of the gate circuit 20 may be doubled.

Otherwise, each of the addresses of the ROM 19 may store one bit data of "1" at 0.1 degree C. intervals of the temperature, and also, each of the addresses of the ROM 19 may store one bit data of "1" at 0.05 degree C. of the temperature by increasing one stage per scale in front of the counter 22.

In the above described embodiment, the memory contents of the ROM 19 are read out when the count of the counter 14 is more than the count of 237. The memory contents of the ROM 19 can be read out after the count of the counter 14 becomes zero, by changing the set value of the preset circuit 21 to the suitable value. For example, the count of the counter 22 becomes 350 when the count of the counter 14 becomes 237.

In place of the comparator 26, a latch circuit for temporarily latching the count of the counter 14 and a comparator for comparing the latched value of the latch circuit to the count of the counter 14 may be provided.

To switch between a Centigrade display and a Fahrenheit display, one bit data for the Centigrade display and one of the Fahrenheit display are additionally provided in each of the addresses of the ROM 19, and the Centigrade display and Fahrenheit display are switched from one to the other with the change of the preset value of the preset circuit.

As described above, according to an embodiment of the present invention, the thermometer comprises a memory circuit for storing one bit data as temperature data so as to measure the actual temperature by the temperature-sensitive resistance showing a non-linear characteristic. Accordingly, the temperature-sensitive resistance which changes the resistance value in response to the surrounding temperature and the reference resistance which rarely changes the resistance value in response to the surrounding temperature are connected to the oscillator for oscillating the frequency in direct or inverse proportion in response to the resistance values, so that the temperature detected by the temperature-sensitive resistance is measured by comparing between the oscillating frequencies generated from the oscillator connected to each of the above resistances, and also, the temperature detected by the temperature-sensitive resistance is measured by the oscillating frequency generated from the oscillator connected to the temperature-sensitive resistance during a predetermined period without using the reference resistance. When reference resistance is not used, a predetermined counting period of the counter 14 is applied for counting the frequency from the oscillator connected to the temperature-sensitive resistance.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic thermometer comprising:

oscillating means operatively connected to a temperature-sensitive resistance for producing an oscillation signal that corresponds to a resistance value for said temperature-sensitive resistance;

first counter means for counting an oscillation frequency of said oscillation signal;

counter-control means for controlling a temperature measurement interval, said temperature measurement interval being a time interval for operation of said first counter means;

memory means responsive to said first counter means for storing temperature data, having a plurality of addresses, each address of said memory means storing a specific data related to a temperature increase in a division of said temperature measured interval, said memory means producing output signals corresponding to said specific data from an address that is accessed by a signal from said counter means; and calculation means responsive to said counter control means and said output signals from said memory means for calculating temperature data, said calculating means accumulating said output signals ouput from said memory means in accordance with the count of said first counter means, said calculation means including second counter means for producing an accumulation of said specific data from said output signals.

2. The electronic thermometer of claim 1, further comprising a reference resistance operatively connected to said oscillating means.

3. The electronic thermometer of claim 2, wherein said reference resistance is provided for defining said temperature measurement interval.

4. The electronic thermometer of claim 3 further comprising display means for displaying said temperature data calculated by said calculation means.

5. The electronic thermometer of claim 4, wherein said calculation means comprises a temporary latching means for temporary storage of a maximum value of said accumulation of said specific data prior to displaying as said temperature data, and comparing means for comparing said maximum value stored in said latching means and said accumulation.

6. The electronic thermometer of claim 5, wherein said calculation means further comprises a preset means for loading an initial value into said second counter, said initial value corresponding to a scale boundary of said electronic thermometer.

7. The electronic thermometer of claim 1, further comprising display means for displaying temperature data calculated by said calculation means.

8. The electronic thermometer of claim 7 wherein said calculation means comprises a temporary latching means for temporary storage of a maximum value of said accumulation of said specific data prior to displaying as said temperature data; and comparing means for comparing said maximum value stored in said latching means and said accumulation.

9. The electronic thermometer of claim 8 wherein said calculation means further comprises a preset means for loading an initial value into said second counter, said initial value corresponding to a scale boundary of said electronic thermometer.

* * * * *